April 30, 1929.  T. W. JOHNSON  1,711,459
SEPARABLE FASTENER
Filed Aug. 15, 1927
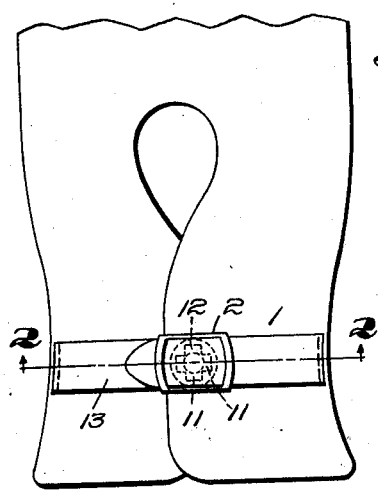
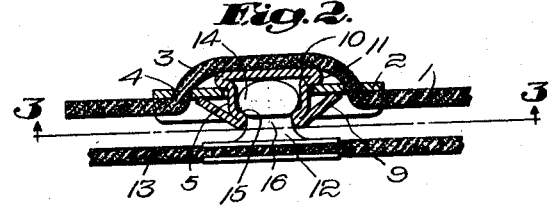
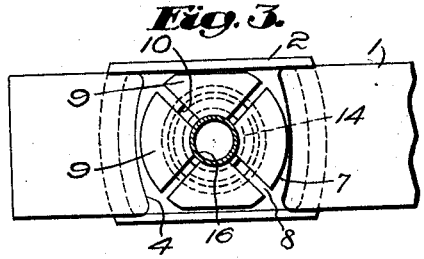
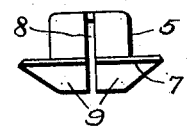
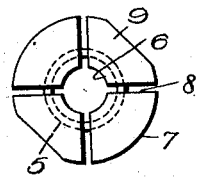
Inventor:
Thomas William Johnson
by Emery, Booth, Janney + Varney
Attys Patented Apr. 30, 1929.

1,711,459

UNITED STATES PATENT OFFICE.

THOMAS WILLIAM JOHNSON, OF STAPLEFORD, NOTTS, ENGLAND, ASSIGNOR, BY MESNE ASSIGNMENTS, TO CARR FASTENER COMPANY, A CORPORATION OF MASSACHUSETTS.

SEPARABLE FASTENER.

Application filed August 15, 1927. Serial No. 212,865.

My invention aims to provide improvements in separable fasteners and is directed more particularly to a socket member of a separable fastener.

In the drawings, which illustrate a preferred embodiment of the invention:—

Figure 1 is an elevation of the fastener shown in use on the strap of a glove, part of the glove being broken away;

Fig. 2 is a section on the line 2—2 of Figure 1 showing the fastener and portions of the strap elements, the stud member being shown in elevation;

Fig. 3 is a section taken on the line 3—3 of Fig. 2 looking toward the socket element; and Fig. 4 includes a side view and a plan view of the stud-receiving portion of the socket before it is secured to the attaching part of the socket element.

Referring to the drawings, I have shown a stud and socket fastener particularly, though not exclusively useful in adjustably securing the ends of a strap or straps. One of the fastener members is secured in fixed relation to one end of the straps or straps and the cooperating fastener part is slidable relative to the other end of the strap or straps, thereby permitting adjustment thereof.

The socket element is shown as being slidably secured to the strap part 1 (Fig. 2) and includes an attaching part 2 and a stud-receiving part 3. The attaching part is substantially U-shaped in cross-section and is provided at each end with generally curved slots 4 through which the strap may be threaded, as shown in Figs. 2 and 3.

The stud-receiving part, before attachment to the attaching part, (Fig. 4) includes a tubular-shaped portion 5 closed at one end, an inwardly extending ledge portion 6 at the other end and an outwardly extending flange 7 which slopes from the ledge portion 6 toward the closed end of the tubular part 5. This stud-receiving part 3 is divided by a plurality of slits 8 extending from the flange 7 through the tubular portion 5 and terminating at the closed end portion of the tubular portion 5, as best indicated in Fig. 4. These slits 8 divide the stud-receiving portion into a plurality of expansible and contractible stud-engaging fingers 9.

In securing the stud-receiving portion 3 to the attaching part 2, the closed end portion of the tubular rivet portion 5 is passed through the aperture 10 in the attaching part until the other ends of the fingers 9 engage the under face of the attaching part 2, as shown in Fig. 2. Thereafter the closed end portion of the tubular rivet portion 5 is "bumped" or pressed toward the outer face of the attaching part 2 so that it forms a plurality of flange portions 11 which seat against the outer face of the attaching part 2, as best indicated in Fig. 2. Thus, the stud-receiving part 3 is held in assembled relation with the attaching part 2 by means of the flange portions 11 seated against one face of the attaching part, as indicated in Fig. 2. When the socket installation is complete, the resilient fingers extend downwardly then inwardly to provide the ledge 6 then outwardly and upwardly to provide the flange 7. Expansion of the fingers is permitted by forming the opening 10 in the attaching part 2 of slightly larger diameter than the cross-sectional diameter of the fingers which provide the tubular portion 5. I have found that the type of stud-receiving part 3, above described, is particularly suited for fastener units of the type herein described, because the ends of the stud-engaging fingers 9 ride along the under surface of the attaching part 2 when they are expanded and contracted. The fingers yield throughout their entire length and, therefore, are less likely to be set than when attached to a flexible support.

The stud member 12 may be secured to the strap portion 13 in any suitable manner and the head and neck portions of the stud member may be of any suitable contour to provide proper engagement with the stud-receiving part 3. When the stud member illustrated in Fig. 2 is engaged with the socket the head 14 of the stud is located in the cup-shaped portion of the stud-receiving part 3 and the ledge portion 6 engages back of the shoulder 15 provided between the head 14 and neck 16 of the stud, as shown in Figs. 2 and 3.

While I have shown and described a preferred embodiment of my invention, I do not wish to be limited thereto, my invention being best described in the following claim.

I claim:

A sliding socket unit having a rigid attaching part provided with slots for permitting adjustable attachment to a strap, means providing an opening in said attaching part between the slots, a continuous rigid wall surrounding said opening, a stud-receiving part having a number of resilient fingers passing through said opening and spaced from the said wall thereof to permit expansion of said fingers through their entire length said fingers being flared outwardly against the opposite side of the attaching part and said stud-receiving part being substantially closed at one end and said finger forming a neck-engaging ledge at the other end.

In testimony whereof, I have signed my name to this specification.

THOMAS WILLIAM JOHNSON.